US006824307B2

(12) United States Patent
Vail et al.

(10) Patent No.: US 6,824,307 B2
(45) Date of Patent: Nov. 30, 2004

(54) TEMPERATURE SENSOR AND RELATED METHODS

(75) Inventors: David Kenyon Vail, West Melbourne, FL (US); Frank J. Tabor, Melbourne, FL (US); Daniel P. Blom, Palm Bay, FL (US); Stephen S. Wilson, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/991,559

(22) Filed: Nov. 9, 2001

(65) Prior Publication Data

US 2002/0094010 A1 Jul. 18, 2002

Related U.S. Application Data

(60) Provisional application No. 60/255,007, filed on Dec. 12, 2000.

(51) Int. Cl.[7] .................................................. G01K 7/34
(52) U.S. Cl. ....................................... 374/183; 184/163
(58) Field of Search ................................ 374/183, 170, 374/184, 171–172, 163; 340/588, 599, 521

(56) References Cited

U.S. PATENT DOCUMENTS 3,679,871 A * 7/1972 Evalds ....................... 219/499
3,946,285 A * 3/1976 Beery et al. ................ 317/123
4,041,382 A * 8/1977 Washburn ................. 324/65 R
4,206,648 A * 6/1980 Tuska et al. ............ 73/362 AR
4,669,049 A * 5/1987 Kosednar et al. ........... 364/557
4,669,654 A * 6/1987 Levine et al. ............. 236/46 R
4,801,211 A * 1/1989 Yagi et al. ..................... 374/28
4,841,458 A * 6/1989 Levine et al. ............... 364/557
4,864,513 A * 9/1989 Levine et al. ............... 364/482
RE33,119 E * 11/1989 Baker .......................... 374/102
4,931,803 A 6/1990 Shimko ....................... 342/371
4,980,691 A 12/1990 Rigg et al. .................. 342/372
4,994,814 A 2/1991 Aoki et al. ................. 342/372
4,996,532 A 2/1991 Kirimoto et al. ............. 342/81
5,008,680 A 4/1991 Willey et al. ............... 342/372
5,027,126 A 6/1991 Basehgi et al. ............. 342/372
5,072,228 A 12/1991 Kuwahara ................... 342/360
5,225,841 A 7/1993 Krikorian et al. ........... 342/204

(List continued on next page.)

FOREIGN PATENT DOCUMENTS

EP 594483 A1 * 4/1994 .................. 374/29
JP 09214296 A * 8/1997 ........... G01R/31/28

OTHER PUBLICATIONS

*AD590 Two–Terminal IC Temperature Transducer*, Analog Devices, Inc., Norwood, MA, 1997, pp. 1–10.

*Primary Examiner*—Gail Verbitsky
(74) *Attorney, Agent, or Firm*—Allen, Dyer, Doppelt, Milbrath & Gilchrist, P.A.

(57) ABSTRACT

A temperature sensor may include a capacitor, a circuit element coupled in series with the capacitor and having a resistance that varies with temperature, and a controller. The controller is for charging/discharging the capacitor through the circuit element, measuring a charging/discharging time required to charge/discharge the capacitor to a predetermined threshold, and determining a temperature based upon the charging/discharging time. More specifically, the circuit element may be a thermistor, for example. The temperature sensor may further include at least one calibration resistor coupled between the controller and the capacitor. As such, the controller may sequentially charge/discharge the capacitor through the circuit element and the at least one calibration resistor, measure respective charging/discharging times required to charge/discharge the capacitor to the predetermined threshold through the circuit element and the at least one calibration resistor, and determine the temperature based upon the charging/discharging times.

18 Claims, 5 Drawing Sheets

U.S. PATENT DOCUMENTS

| | | | | | |
|---|---|---|---|---|---|
| 5,231,405 | A | | 7/1993 | Riza | 342/375 |
| 5,243,274 | A | | 9/1993 | Kelsey et al. | 324/158 R |
| 5,283,587 | A | | 2/1994 | Hirshfield et al. | 342/372 |
| 5,353,031 | A | | 10/1994 | Rathi | 342/372 |
| 5,493,255 | A | | 2/1996 | Murtojarvi | 330/296 |
| 5,559,519 | A | | 9/1996 | Fenner | 342/174 |
| 5,592,179 | A | | 1/1997 | Windyka | 342/372 |
| 5,629,676 | A | * | 5/1997 | Kartoun et al. | 340/567 |
| 5,655,841 | A | | 8/1997 | Storm | 374/183 |
| 5,657,238 | A | * | 8/1997 | Lindeboom | 364/483 |
| 5,680,141 | A | | 10/1997 | Didomenico et al. | 342/372 |
| 5,771,016 | A | | 6/1998 | Mullins et al. | 342/372 |
| 5,874,825 | A | * | 2/1999 | Brotto | 320/150 |
| 5,938,779 | A | | 8/1999 | Preston | 714/718 |
| 5,990,830 | A | | 11/1999 | Vail et al. | 342/368 |
| 5,995,740 | A | | 11/1999 | Johnson | 395/500.41 |
| 5,999,990 | A | | 12/1999 | Sharrit et al. | 718/8 |
| 6,011,512 | A | | 1/2000 | Cohen | 342/372 |
| 6,023,742 | A | | 2/2000 | Ebeling et al. | 710/107 |
| 6,100,510 | A | * | 8/2000 | Chen et al. | 219/481 |
| 6,157,681 | A | | 12/2000 | Daniel et al. | 375/298 |
| 6,163,220 | A | | 12/2000 | Schellenberg | 330/295 |
| 6,172,642 | B1 | | 1/2001 | DiDomenico et al. | 342/368 |
| 6,320,512 | B1 | * | 11/2001 | Nicholson et al. | 340/588 |
| 6,416,471 | B1 | * | 7/2002 | Kumar et al. | 600/300 |
| 6,612,737 | B1 | * | 9/2003 | Lobban | 374/183 |
| 6,629,776 | B2 | * | 10/2003 | Bell et al. | 374/170 |
| 2002/0105436 | A1 | * | 8/2002 | Bell et al. | 340/870.17 |

* cited by examiner

TEMPERATURE SENSOR AND RELATED METHODS

RELATED APPLICATION

This application is based upon prior filed copending provisional application Ser. No. 60/255,007 filed Dec. 12, 2000, the entire subject matter of which is incorporated herein by reference in its entirety.

FIELD OF THE INVENTION

The present invention relates to the field of electronic circuits, and more particularly, to an electronic temperature sensor.

BACKGROUND OF THE INVENTION

Temperature sensors are used in a wide variety of applications. Many different types of temperature sensors are commercially available, and the type of temperature sensor that will be used in any particular application will depend on several factors. For example, cost, space constraints, durability, and accuracy of the temperature sensor are all considerations that typically need to be taken into account.

One particular application in which a relatively high degree of accuracy may be required of a temperature sensor is in the field of antennas. More particularly, so-called "smart" antenna systems are commonly being used in both ground based applications (e.g., cellular antennas) and airborne applications (e.g., airplane or satellite antennas). Smart antenna systems, such as adaptive or phased array antennas, combine the outputs of multiple antenna elements with signal processing capabilities to transmit and/or receive communications signals. As a result, such antenna systems can vary the transmission or reception pattern of the communications signals in response to the signal environment to improve performance characteristics.

Of course, one of the factors which affects the signal environment is the temperature at which the antenna elements operate. Accordingly, to provide accurate phase shifting in a phased array antenna system, it is generally desirable to know the temperature of the antenna elements Typical prior art temperature sensors may include thermistors, resistance-temperature detectors (RTDs), and active temperature-dependent current sources, for example. One such active temperature-dependent current source is the AD590 by Analog Devices, Inc., of Norwood, Mass., which is further described in the data sheet entitled "Two-Terminal IC Temperature Transducer" from Analog Devices, Inc., published 1997. Yet, in typical prior art temperature sensor configurations, such devices may require a connection to additional circuitry such as multiplexors, analog conditioning circuitry, and analog-to-digital (A/D) converters, for example.

This additional circuitry not only increases the cost of the temperature sensor, but may also require a relatively large amount of space. Furthermore, to provide a high degree of accuracy, such sensors typically require careful calibration over the operating temperature environment. This may be particularly difficult to perform in spaceborne antennas, for example, where operating temperatures may vary significantly depending upon whether the antenna elements are shaded or in direct sunlight.

Because of issues such as cost, space savings, and the difficulty of calibration, many phased array antenna systems include only a single centralized temperature controller coupled to temperature sensing devices such as those listed above. For example, U.S. Pat. No. 5,680,141 to Didomenico et al. entitled "Temperature Calibration System for a Ferroelectric Phase Shifting Array Antenna" discloses a phased array antenna that includes a single temperature sensor circuit connected to a plurality of temperature sensors, each of which senses the temperature of a phase shifter separate from the phased array antenna elements. Each phase shifter is connected to a plurality of antenna elements. The temperature sensor circuit connects to a data processor system for inputting temperature information used to calculate calibration error factors.

One drawback of such phased array antennas is that all of the temperature compensation processing is performed by a central processor. Thus, if temperatures of a large number of phase shifters are to be monitored, the controller's task of managing temperature compensation may become significantly complicated and require a significant amount of processing resources. Communicating analog temperature data from a large number of sensors back to a central processor can also require a significant amount of wiring and analog processing.

SUMMARY OF THE INVENTION

In view of the foregoing background, it is therefore an object of the present invention to provide a relatively accurate temperature sensor that may be easily calibrated.

This and other objects, features, and advantages in accordance with the present invention are provided by a temperature sensor including a capacitor, a circuit element coupled in series with the capacitor and having a resistance that varies with temperature, and a controller. The controller is for charging/discharging the capacitor through the circuit element, measuring a charging/discharging time required to charge/discharge the capacitor to a predetermined threshold, and determining a temperature based upon the charging/discharging time.

More specifically, the circuit element may be a thermistor, for example. The temperature sensor may further include at least one calibration resistor coupled between the controller and the capacitor. As such, the controller may sequentially charge/discharge the capacitor through the circuit element and the at least one calibration resistor, measure respective charging/discharging times required to charge/discharge the capacitor to the predetermined threshold through the circuit element and the at least one calibration resistor, and determine the temperature based upon the charging/discharging times. In particular, the at least one calibration resistor may include a high and a low calibration resistor.

Additionally, the controller may include a counter for measuring the charging/discharging time, a driver coupled to the circuit element for charging/discharging the capacitor, and a control logic circuit for controlling the driver. Further, the controller may also include a Schmitt hysteresis device coupled to the capacitor for determining when the capacitor has been charged to the predetermined threshold. The controller may also advantageously be implemented in an ASIC.

A method aspect of the invention is for sensing temperature using a capacitor and a circuit element having a resistance that varies with temperature. The method may include charging/discharging the capacitor through the circuit element, measuring a charging/discharging time required to charge/discharge the capacitor to a predetermined threshold, and determining the temperature based upon the charging/discharging time.

More specifically, the circuit element may be a thermistor, for example. The method may also include coupling at least one calibration resistor to the capacitor. As such, charging/discharging the capacitor may include sequentially charging/discharging the capacitor through the circuit element and the at least one calibration resistor, and measuring the charging/discharging time may include measuring respective charging/discharging times required to charge/discharge the capacitor to the predetermined threshold through the circuit element and the at least one calibration resistor. Moreover, determining the temperature may include determining the temperature based upon the charging/discharging times.

Additionally, the at least one calibration resistor may include a high calibration resistor and a low calibration resistor. Measuring the charging/discharging times may further include measuring the charging/discharging time using a counter, and charging/discharging the capacitor may include coupling a driver to the circuit element and charging/discharging the capacitor using the driver.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
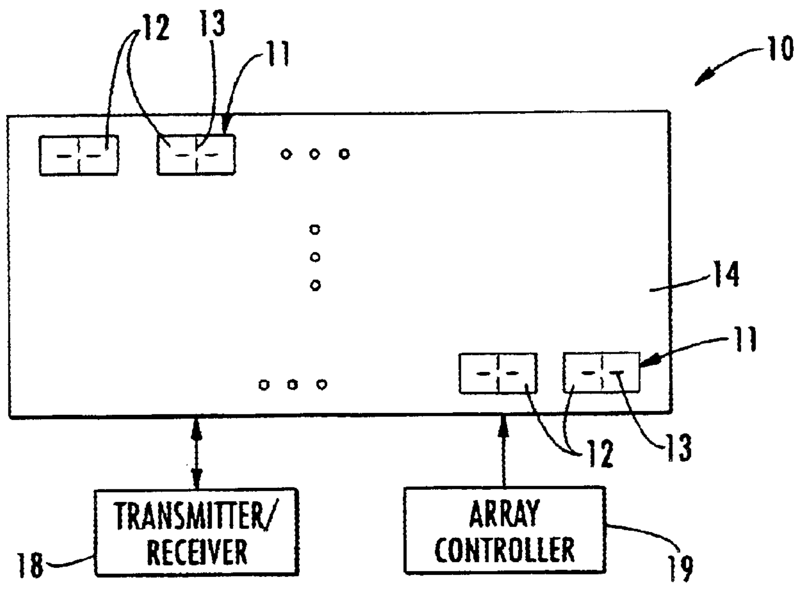
FIG. 1 is a schematic block diagram of a phased array antenna according to the present invention.
Figure 2:
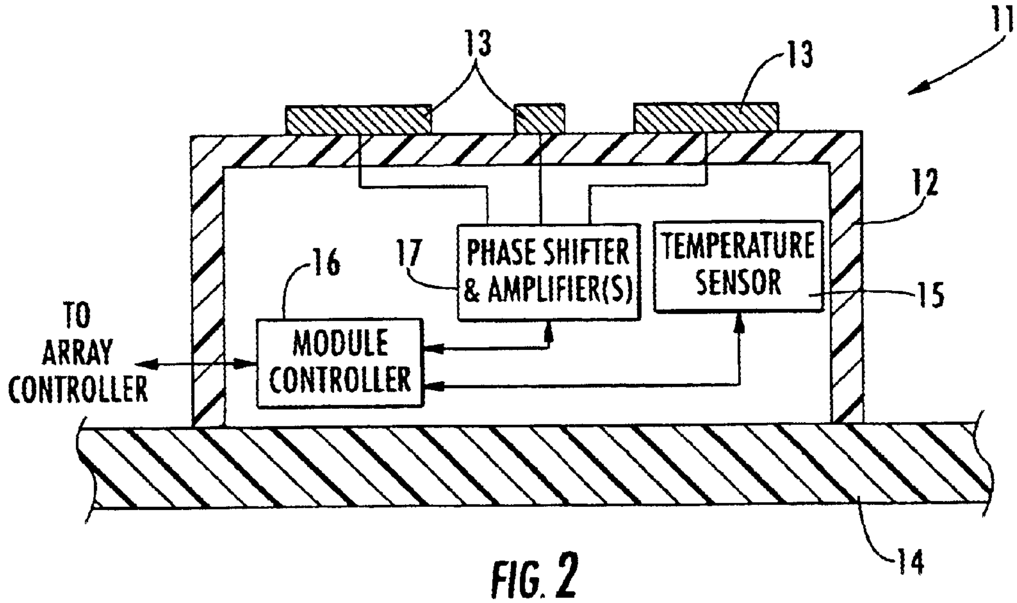
FIG. 2 is a schematic cross-sectional view of a phased array antenna module of the phased array antenna of FIG. 1.
Figure 3:
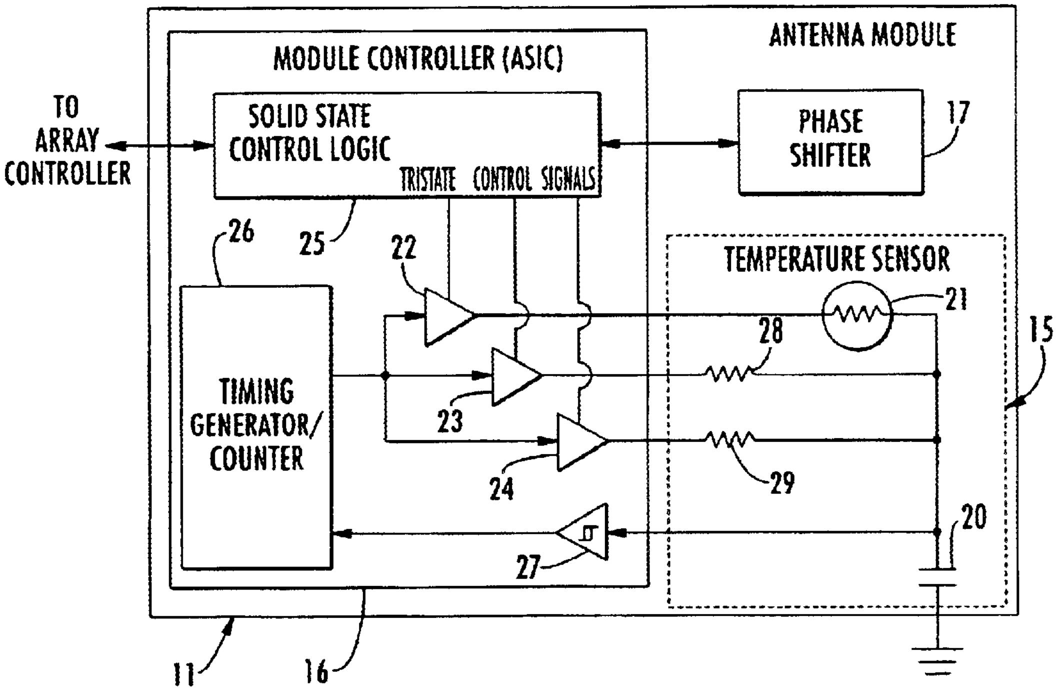
FIG. 3 is a more detailed schematic block diagram of the module controller and temperature sensor of the phased array antenna module of FIG. 2.

Referring initially to FIGS. 1–3, a phased array antenna 10 according to the present invention includes a plurality of phased array antenna modules 11 each including a housing 12 and at least one antenna element 13 associated with the housing. For example, the antenna element 13 may be carried by the housing 12. Each phased array antenna module 11 may be implemented as an RF hybrid module, for example. Also, the antenna elements 13 may be dipole elements made of a conductive metal, for example, and may further be screen printed onto the housings 12. Of course, other suitable antenna elements 13 and methods for making the same which are known to those of skill in the art may also be used.

The phased array antenna modules 11 may be positioned in an array and mounted on a base 14, for example. Both the base 14 and the housings 12 may be a ceramic material, such a low-temperature co-fired ceramic (LTCC), for example, though other suitable materials may also be used. The phased array antenna 10 may also include one or more transmitters/receivers 18 for sending and receiving communications signals (e.g., RF signals) via the phased array antenna modules 11, and an array controller 19 coupled to each of the phased array antenna modules. The array controller 19 will be described further below.

According to the invention, at least one of the phased array antenna modules 11 may also include a temperature sensor 15 carried by a respective housing 12 for measuring a temperature of the at least one phased array antenna module. The temperature sensor 15 may include a capacitor 20 and a circuit element 21 coupled in series with the capacitor which has a resistance that varies with temperature. The capacitor 20 may also be connected to a reference voltage, such as ground, as illustratively shown in FIG. 3.

More specifically, the circuit element 21 may be a thermistor, for example. The temperature sensor 15 also preferably includes one or more calibration resistors, such as high and low calibration resistors 28, 29, coupled (along with the circuit element 21) between a module controller 16 and the capacitor 20.

It should be noted that the antenna elements 13 may be formed on the base 14, and that the module controller 16, one or more phase shifters 17 (both of which are described further below), the temperature sensor 15 and/or other RF control devices (e.g., attenuators, delay devices, etc.) may be included in the base, for example, in some embodiments. Other configurations which will be appreciated by those of skill in the art may also be used, all of which are included within the scope of the present invention.

The module controller 16 may include drivers 22–24 for sequentially charging/discharging the capacitor 20 to a predetermined threshold through the circuit element 21 and calibration resistors 28, 29, respectively. The drivers 22–24 may be CMOS tri-state drivers, for example, though other suitable drivers (e.g., precision analog switches) may also be used. The controller 16 may further include a control logic circuit 25 (e.g., a solid state control logic circuit) for controlling the drivers 22–24 to provide the sequential charging/discharging of the capacitor 20.

The module controller 16 also illustratively includes a timing generator/counter 26 coupled to each of the drivers 22–24 and to a Schmitt hysteresis input device 27. The Schmitt hysteresis input device 27 determines when the capacitor 20 has been charged/discharged to the predetermined threshold, as will be appreciated by those of skill in the art. For example, the predetermined threshold may be the threshold of the Schmitt hysteresis input device 27.

By using a precise timing generator/counter 26, a charging/discharging time required to charge/discharge the capacitor 20 to the predetermined threshold through each of the circuit element 21 and calibration resistors 28, 29 may be accurately measured. That is, the timing generator/counter 26 may measure respective charging times between when one or more of the drivers 22–24 are driven to a logic 1 and when the Schmitt hysteresis input device 27 detects a logic 1, for example. Likewise, the discharging times can also be measured.

As a result, the module controller 16 may determine the temperature of the phased array antenna module 11 based upon the charging/discharging time. That is, since the charging/discharging time is measured through the circuit element 21, it is the resistance of the circuit element (which varies with temperature) that determines the measured charging/discharging time. Thus, by using the measured charging/discharging times, the known fixed resistor values, and known calibration data of the circuit element 21, the temperature may be calculated using various equations which will be discussed further below. Such calibration data is typically provided by the manufacturer, for example.

Furthermore, when respective charging/discharging times are measured through the high and low calibration resistors 28, 29, these charging/discharging times may be used to determine circuit error parameters such as variability of the capacitor 20 (i.e., capacitance variation) and changes in the input logic threshold of the Schmitt hysteresis input device 27. While the temperature may be calculated using only the charging/discharging time through the circuit element 21, using the calibration resistors 28, 29 provides for even greater accuracy because the charging/discharging time may then be substantially normalized to changes in the thermistor resistance alone. The temperature measurement accuracy thus achieved may therefore approach the accuracy of the circuit element 21 alone, which for a thermistor may be ±0.1° C. or better.

It will therefore be appreciated by those of skill in the art that the present invention thus essentially provides a "self-calibrating" system, since the module controller 16 may compensate for changes in the above circuit error parameters. This may be particularly advantageous for ground or sea based phased array antennas (e.g., antennas on Naval ships, etc.), where the replacement of a failed antenna module may otherwise require cumbersome re-calibration.

Moreover, to further improve accuracy, a precision reference voltage, not shown, may be used to power the module controller 16 in some embodiments. Additionally, high quality analog switches, not shown, may be added in series with the circuit element 21 and calibration resistors 28, 29 to minimize errors due to leakage current from the drivers 22–24 in some embodiments. Also, additional calibration resistors may be added to calibrate the temperature sensor 15 closer to specific operating temperatures, as will be appreciated by those of skill in the art.

As noted above, prior art temperature sensors typically require multiplexors, analog conditioning circuitry, A/D converters, etc., to be connected to the temperature sensing device (e.g., a thermistor). As a result, even if it were possible to include such additional circuitry in a phased array antenna module, this would consume a significant amount of space and would also increase costs. Moreover, the performance of such components will typically vary with temperature and radiation exposure, which may further add to the difficulty of locating such prior art temperature sensors in a phased array antenna module. Thus, in prior art phased array antennas, temperature sensing and compensation of phased array antenna modules based thereon is typically performed by the central phased array controller using stored tables of compensation test data, for example.

One particular advantage of the present invention is that the temperature of each individual phased array antenna module 11 may be determined at that module by its module controller 16. That is, the control logic 25 may store the calibration data of the circuit element 21 and resistance values of the calibration resistors 28, 29 and directly calculate the temperature compensation values based upon the measured charging/discharging times, as described above. For example, the antenna module 11 could measure the temperature and then autonomously calculate or look up the corresponding temperature compensation values. Alternately, the control logic 25 may instead report accurately scaled temperature data to the array controller 19, which simplifies the array controller's task of performing temperature compensation.

Additionally, each phased array antenna module 11 may include a phase shifter 17 and associated amplifier(s) carried by the housing 12 and coupled to the antenna elements 13 (FIG. 2). Of course, other devices such as attenuators, delay devices, etc., may also be included, as will be appreciated by those of skill in the art. Such phase shifters, attenuators, and/or delay devices may be digitally controlled, for example. Based upon the temperature data transmitted to the array controller 19 by the control logic 25, the array controller may control each phase shifter 17 based upon the temperature of its respective phased array antenna module 11 via the control logic 25.

Alternatively, according to the present invention the control logic 25 may advantageously store or download the temperature compensation lookup tables from the array controller 19 and determine the requisite phase shifting for the phased array antenna module 11. Thus, the task of temperature compensation management may be decentralized from the array controller 19 to each of the phased array antenna modules 11, which simplifies the antenna controller 19.

The module controller 16 may advantageously be implemented in a digital ASIC, for example. Again, this is because temperature sensing according to the present invention does not require additional multiplexors, analog conditioning circuitry, A/D converters, etc., as in the prior art, which may otherwise make implementation in an ASIC problematic. In fact, many phased array antenna module designs already include a module control ASIC for interfacing with the array controller, and such modules may already include adequate logic gate and input/output resources to be able to implement temperature sensing and compensation as described above without excessive design modifications. Additionally, the capacitor 20, circuit element 21, and calibration resistors 28, 29 may potentially be included within such an ASIC in certain applications, as will be appreciated by those of skill in the art. Of course, it will be appreciated by those of skill in the art that certain of the components illustratively shown within the module controller (i.e., ASIC) 16 may be implemented outside of the ASIC using separate discrete components in some embodiments.

Figure 4:
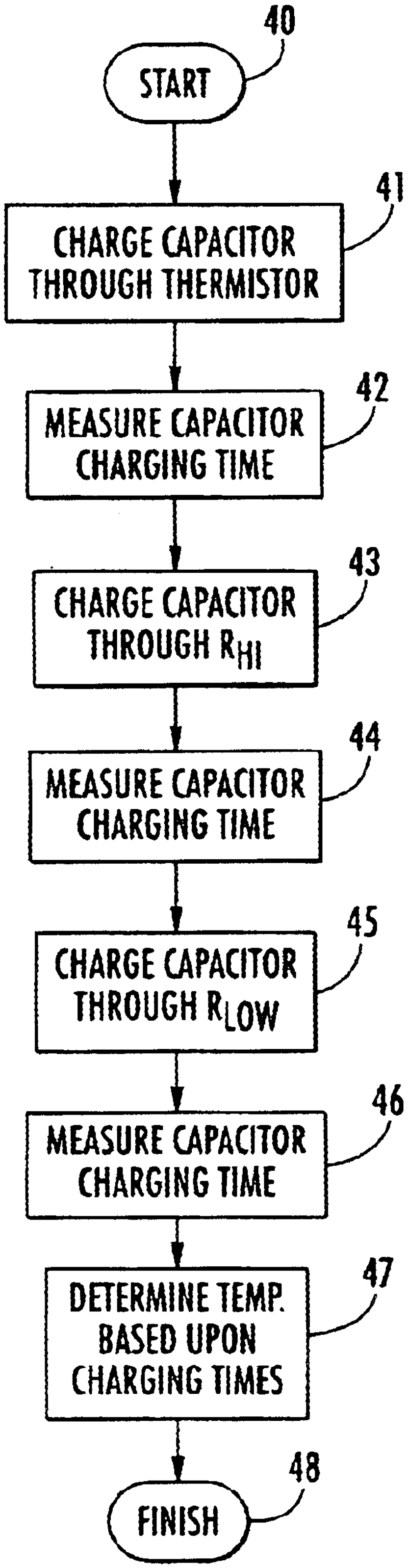
FIG. 4 is a flow diagram of a method for sensing a temperature according to the present invention.

Turning now to the flow diagram of FIG. 4, a method aspect of the invention for sensing the temperature of a phased array antenna module 11 is now described. As noted above, the phased array antenna module preferably includes the capacitor 20, the circuit element 21, and the high and low calibration resistors 28, 29. The method begins (Block 40) by charging/discharging the capacitor 20 through the circuit element 21, at Block 41, and measuring the charging/discharging time required to charge/discharge the capacitor to the predetermined threshold, at Block 42, as described above. Of course, those skilled in the art will appreciate that various predetermined thresholds may be used, and that the predetermined thresholds used for charging and discharging may be different. The capacitor 20 is then similarly charged/discharged to the predetermined threshold through the calibration resistor 28 ($R_{HI}$), the charging/discharging time then measured (Block 44), and again charged/discharged through the calibration resistor 29 ($R_{LOW}$), at Block 45, and the charging/discharging time measured again. With one thermistor and two calibration resistors, up to fourteen timing measurements are possible, for example. Moreover, depending on the accuracy desired, some embodiments might only measure charge or discharge times, using just $R_{THERMISTOR}$, $R_{LO}$, $R_{HI}$, $R_{THERMISTOR}$ and $R_{LO}$, and $R_{THERMISTOR}$ and $R_{HI}$, etc.

The charging/discharging and measurements steps 41–46 are preferably performed in a relatively rapid sequence to reduce the likelihood that the above described error parameters will vary between measurements. Once the various charging/discharging times are measured, the temperature of the phased array antenna module may be determined based upon the charging/discharging times, at Block 47, as previously described above, thus ending the method (Block 48). It will be appreciated that the ratio of the charging times may be based upon the ratio of the calibration resistances to the thermistor resistance, as will be described further in the example below.

Because of its accuracy, ease of integration and calibration, and other advantages, those of skill in the art will appreciate that the above described temperature sensor 15 and controller 11 may be used in numerous applications where temperature sensing is required other than antennas. For example, the temperature sensor of the present invention may be well suited for numerous applications, such as precision imaging sensors, temperature compensated oscillators, precision thermal control circuits, thermal instrumentation circuits, voltage references, process control systems, and even low-cost consumer products such as watches and toys that detect handling via temperature changes. Other examples include industrial/factory remote temperature monitoring, automobile/truck wheel hub remote temperature sensing, and other distributed temperature measuring applications where relatively low complexity and low power are desired (e.g., without analog-to-digital converters, etc.). Those of skill in the art will appreciate numerous other applications as well.

Thus, the present invention also more generally provides a temperature sensor which includes a capacitor 20, a circuit element 21 coupled in series with the capacitor and having a resistance that varies with temperature, and a controller 16. As previously described above, the controller 16 charges/discharges the capacitor 20 through the circuit element 21, measures a charging/discharging time required to charge/discharge the capacitor to a predetermined threshold, and determines a temperature based upon the charging/discharging time.

Again, the circuit element 21 may be a thermistor, for example, and the temperature sensor may also include low and high calibration resistors 28, 29 coupled between the controller 16 and the capacitor 20 in parallel with the circuit element. The controller 16 may also include a counter 26 for measuring the charging/discharging times, drivers 22–24 coupled to the circuit element 21 and calibration resistors 28, 29, respectively, for charging/discharging the capacitor 20, and a control logic circuit 25 for controlling the drivers. Furthermore, the controller 21 may also include a Schmitt hysteresis device 27 coupled to the capacitor 20 for determining when the capacitor has been charged/discharged to the predetermined threshold Of course, those of skill in the art will appreciate that other suitable device may also be used, such as comparators or differential line receivers, for example. As previously discussed, the controller 16 may also be implemented in an ASIC.

Determination of the temperature using the charging/discharging times as described above will be further understood with reference to the following example.

EXAMPLE

Figure 5:
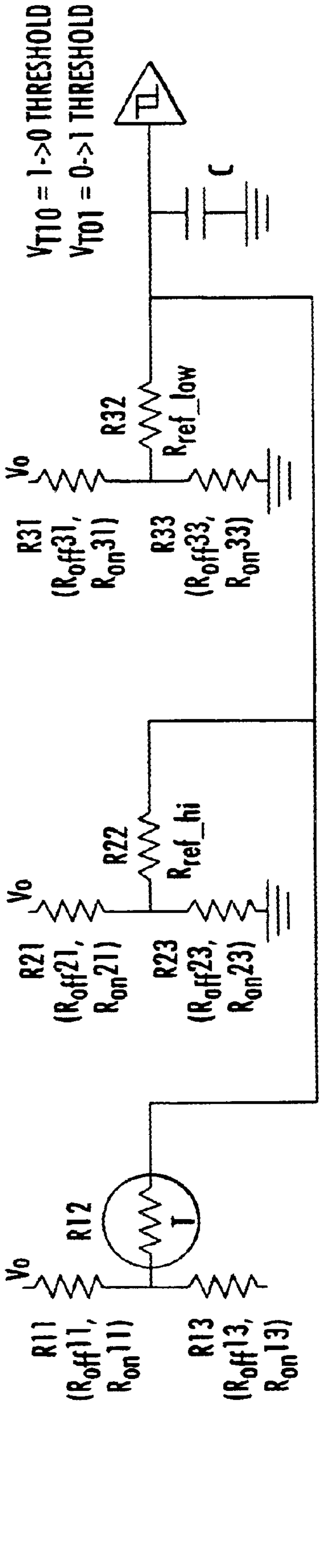
FIG. 5 is a schematic circuit diagram of an equivalent circuit for the temperature sensor of FIG. 3.

The following example is based upon the temperature sensor 15 illustratively shown in FIG. 3, which includes a thermistor as the circuit element 21, the high and low calibration resistors 28, 29, and the capacitor 20. An equivalent schematic circuit representation of the temperature sensor 15 modeled as a network of resistors driving a load capacitor is illustrated in FIG. 5. The resistors R11, R21, R31, R13, R23, and R33 are used to model the driver output impedances. For example, when the driver 22 charges the capacitor 20 through the thermistor R12, then R11 is modeled as a low impedance ($R_{on}$11), and R21, R31, R13, R23, and R33 are modeled as high impedances ($R_{off}$21, $R_{off}$31, $R_{off}$13, $R_{off}$23, and $R_{off}$33).

The following is a summary of the basic circuit operation for purposes of the present example. The capacitor C is initially charged when the drivers 22–24 all drive high (for many time constants). The time is measured for discharging the capacitor C through the parallel combination of resistors R12, R22, and R32, followed by recharging the capacitor C for the next measurement cycle. A total of seven discharge times are measured, through the seven possible combinations of the resistors R11, R21, and R31 being high or low impedance as follows: 1) $R_{on}$11, with $R_{off}$21 and $R_{off}$31; 2) $R_{on}$11 with $R_{on}$21 and $R_{off}$31; 3) $R_{on}$11 with $R_{on}$21 and $R_{on}$31; 4) $R_{on}$11 with $R_{off}$21 and $R_{on}$31; 5) $R_{off}$11 with $R_{on}$21 and $R_{off}$31; 6) $R_{off}$11 with $R_{on}$21 and $R_{on}$31; 7) $R_{off}$11 with $R_{off}$21 and $R_{on}$31. For additional accuracy, the seven discharge timing measurements can be followed by seven similar charging time measurements.

The following equations show how the resistance of the thermistor R12 can be accurately calculated based on these timing measurements plus the known values of the resistors R22 and R32. Leakage currents, imprecise timing capacitance value, non-zero driver impedances, and varying threshold voltages are errors that can be nulled out, as described below. For the following equations, $R_{on}$11, $R_{on}$21, $R_{on}$31 are the driver-on impedances from Vo; $R_{off}$11, $R_{on}$21, $R_{on}$31 are the driver-off leakage impedances from Vo; $R_{on}$13, $R_{on}$23, $R_{on}$33 are the driver-on impedances to ground; and $R_{off}$13, $R_{off}$23, Rff33 are the driver-off leakage impedances to ground.

Figure 6A:
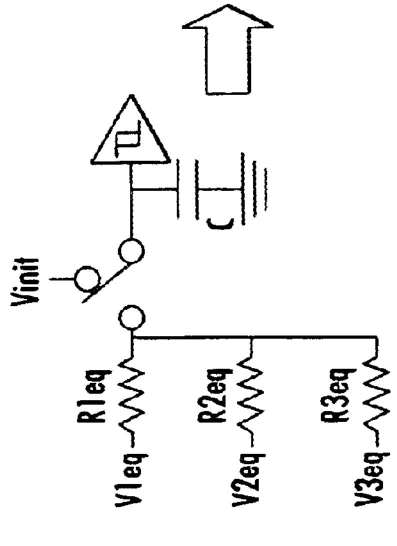
FIGS. 6A–6C are schematic circuit diagrams illustrating simplified circuit portions of the equivalent circuit of FIG. 5.
Figure 6B:
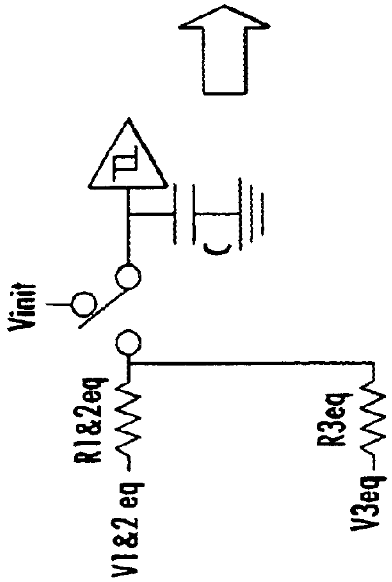
Figure 6C:
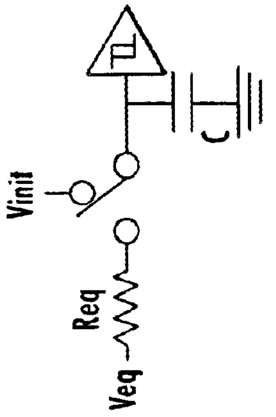

Simplified versions of the equivalent circuit of FIG. 5 are illustrated in FIGS. 6A–6C. For a particular driver set of enabled and disabled drivers, V1eq and R1eq represent the equivalent for the driver 22, V2eq and R2eq for the driver 23, etc Also, V1&2eq and R1&2eq are equivalent to the combination of V2eq, R2eq, V1eq and R1eq. The references Veq and Req represent the entire aggregate equivalent drive from all three drivers 22–24. The value of R1eq can be calculated as the parallel combination of the resistors R11 and R13, plus the series resistor R12 as follows:

$$R1eq=R11*R13/(R11+R13)+R12. \quad (1)$$

The values of R2eq and R3eq are calculated in a similar fashion:

$$R2eq=R21*R23/(R21+R23)+R22; \quad (2)$$

and $$R3eq=R31*R33/(R31+R33)+R32. \quad (3)$$

Further, R1&2eq is the parallel combination of R1eq and R2eq:

$$R1\&2eq=R1eq*R2eq/(R1eq+R2eq). \quad (4)$$

Also, Req is the parallel combination of R1eq, R2eq, and R3eq, as follows:

$$Req=R1eq*R2eq*R3eq/(R1eq*R2eq+R2eq*R3eq+R1eq*R3eq). \quad (5)$$

The value of V1eq is calculated as the voltage divider of R11 and R13, that is:

$$V1eq=Vo*R13/(R11+R13). \quad (6)$$

The values of V2eq and V3eq are similarly calculated:

$$V2eq=Vo*R23/(R21+R23); \quad (7)$$

and $$V3eq=Vo*R33/(R31+R33). \quad (8)$$

The value of V1&2eq is calculated as the voltage divider of R1eq and R2eq with V1eq and V2eq as follows:

$$V1\&2eq=(V1eq-V2eq)*R2eq/(R2eq+R3eq)+V2eq. \quad (9)$$

The value of Veq is similarly calculated as the voltage divider of R1&2eq and R3eq with V1&2eq and V3eq:

$$Veq = V3eq + R3eq^*(V1eq - V2eq)*R2eq/(R1eq + R2eq) + V2(eq - V3eq))/(R3eq + R1eq*R2eq/(R1eq + R2eq)). \quad (10)$$

The charge and discharge times follow the general capacitance charge and discharge equations (11) and (12):

$$Vc=\text{Vinit}*(1-exp(-t/R*C)); \quad (11)$$

and $$Vc=\text{Vinit}*(exp(-t/RC)), \quad (12)$$

where Vc is the voltage on the capacitor C.

For the simplified circuit illustrated in FIG. 6C, the capacitor C is initially charged to a voltage Vinit, and it then charges or discharges via Req towards the value Veq. The time to charge or discharge to a threshold Vt10 or Vt01 is measured as described above. If Veq is greater than Vinit, then the charging equation (11) applies. If Vinit is greater than Veq, then the charging equation (12) applies. Equations (13) and (14) below show how the measured time for a particular set of drivers 22–24 driving high, low, or off to a threshold Vt10 or Vt01 must satisfy the charging and discharge equations. That is, for charging the capacitor C from Vinit to a threshold Vt01:

$$Vt01=\text{Vinit}*(1-exp(-t/Req*C)); \quad (13)$$

and for discharging the capacitor C from Vinit to a threshold Vt10:

$$Vt10=\text{Vinit}*(exp(-t/Req*C)). \quad (14)$$

Solving equations (13) and (14) for t:

$$t=-Req*C*\ln(1-Vt01/\text{Vinit}); \text{ (charging)} \quad (15)$$

and $$t=-Req*C*\ln(Vt10/\text{Vinit}). \text{ (discharging)} \quad (16)$$

Since R12 does not solely determine any of the measured time values, an accurate value of R12 cannot be determined from a single timing measurement. However, as many as fourteen independent timing measurements can be made on this circuit, and all these time measurements should simultaneously satisfy equations (15) and (16) (i.e., as many as seven different charge and seven discharge timing measurements could be made). These fourteen equations can be solved to very precisely calculate the resistance value of the thermistor R12, and this value corresponds to the temperature measurement the circuit is designed to report. The fourteen equations can be used to calculate the following variables, for example: the thermistor R12 value; high side leakage current of the driver 22, modeled as $R_{off}11$; the low side leakage current of the driver 22, modeled as $R_{off}13$; the high side leakage current of the driver 23, modeled as $R_{off}21$; the low side leakage current of the driver 23, modeled as $R_{off}23$; the high side leakage current of the driver 24, modeled as $R_{off}31$; the low side leakage current of the driver 24, modeled as $R_{off}33$; the Vt01 threshold value; the Vt10 threshold value; the high-side driver-on impedance value $R_{on}11$, $R_{on}21$, and $R_{on}31$ (assuming these values are equal); the low-side driver-on impedance value $R_{on}13$, $R_{on}23$, and $R_{on}33$ (assuming these values are equal); and the exact value of the timing capacitor C.

The fourteen equations can theoretically be solved directly for R12, so that R12 is expressed as a mathematical function of R22, R32, and the timing measurements. The equations can also be solved iteratively using standard numerical methods. For the latter case, the iteration begins by initially substituting the fourteen measured delay values into the fourteen equations along with nominal initial values of the twelve error variables. These initial values are then modified until a solution is found, and R12 is thereby calculated, as will be understood by those of skill in the art.

For many applications, the fourteen equations can be significantly simplified. It should be noted that the capacitance of the capacitor C is a common factor in all the equations and can be divided out. Also, the high and low side driver impedance values may generally be small (e.g., 10 to 20 ohms) compared with typical thermistor values (e.g., 10K ohms), and so estimating these values will not significantly degrade temperature measurement accuracy. Likewise, the values of Vt01 and Vt10 are typically known, fixed values (within a small range) for most circuits, and can likewise be estimated. With these assumptions, the number of variables is reduced to seven, which means that only the seven charge (or discharge) timing measurements are needed for many applications.

Further tradeoffs of accuracy versus simplicity of calculation can be made by assuming that the high side leakage currents of R11, R13, and R21 are all approximately equal, since they may be on the same driver chip (i.e., part of the same ASIC) and have similar characteristics. The same argument applies for the low side leakage currents of R23, R31, and R33. With these additional assumptions, only three timing measurements are needed to resolve the three unknowns (i.e., the thermistor, the high side leakage current, and the low side leakage current.)

Another method of trading accuracy versus simplicity is to perform occasional "self-calibration" calculations that are more exact to calculate more accurate initial estimates for more of the full set of twelve variables. For example, a more-exact software-based calculation could be used to calibrate a simpler but faster algorithm implemented in dedicated logic in an ASIC. The self-calibration can be performed once when the circuit is initially manufactured, periodically at set intervals, or even at variable intervals that depend on the error history (i.e. an adaptive rate algorithm).

In summary, a range of accuracy versus complexity choices are available based on the basic methods outlined above. The optimum tradeoff of accuracy versus complexity can be customized in several different ways, depending upon the requirements of the particular application.

It will therefore be appreciated by those of skill in the art that the present invention provides a relatively simple temperature sensor design which requires only a few passive parts, is relatively inexpensive, and that will fit within a phased array antenna module (e.g., an RF module).

Furthermore, when an integrated temperature sensor is used, the array module can provide its own temperature compensation, which in turn may provide simplified array design, assembly, and testing. In addition, array performance may be improved in the phased array antenna 10 according to the present invention because even though individual modules may be at different temperatures (i.e., because of partial sunlight, shadows, etc.), accurate temperature compensation may be performed at each antenna module. Also, management of module temperature by a host processor for the phased array antenna module 10 may advantageously be reduced according to the invention.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A temperature sensor comprising:

a capacitor;

a circuit element coupled in series with said capacitor and having a resistance that varies with temperature;

a plurality of calibration resistors coupled to said capacitor and having different resistance values; and a controller for sequentially charging said capacitor through said circuit element and each of said calibration resistors, measuring respective charging times required to charge said capacitor to a predetermined threshold through said circuit element and said calibration resistors, cooperating with said plurality of calibration resistors to determine a capacitance variation of said capacitor, and determining the temperature based upon the charging times and the capacitance variation.

2. The temperature sensor of claim 1 wherein said circuit element comprises a thermistor.

3. The temperature sensor of claim 1 wherein said plurality of calibration resistors comprises a high calibration resistor and a low calibration resistor, said low calibration resistor having a lower resistance value than said high calibration resistor.

4. The temperature sensor of claim 1 wherein said controller comprises a counter for measuring the charging time.

5. The temperature sensor of claim 1 wherein said controller comprises a driver coupled to said circuit element for charging said capacitor.

6. The temperature sensor of claim 5 wherein said controller further comprises a control logic circuit for controlling said driver.

7. The temperature sensor of claim 1 wherein said controller comprises a Schmitt hysteresis device coupled to said capacitor for determining when said capacitor has been charged to the predetermined threshold.

8. The temperature sensor of claim 1 wherein said controller is implemented in an ASIC.

9. A temperature sensor comprising:

a capacitor;

a thermistor coupled in series with said capacitor;

a high calibration resistor coupled to said capacitor;

a low calibration resistor coupled to said capacitor and having a lower resistance value than said high calibration resistor; and a controller for sequentially charging said capacitor through said thermistor and each of said high and low calibration resistors, measuring respective charging times required to charge said capacitor to a predetermined threshold through said thermistor and each of said high and low calibration resistors, cooperating with said plurality of calibration resistors to determine a capacitance variation of said capacitor, and determining a temperature based upon the charging times and the capacitance variation.

10. The temperature sensor of claim 9 wherein said controller comprises a counter for measuring the charging times.

11. The temperature sensor of claim 9 wherein said controller comprises at least one driver coupled to said thermistor and said at least one resistor for charging said capacitor.

12. The temperature sensor of claim 11 wherein said controller further comprises a control logic circuit for controlling said at least one driver.

13. The temperature sensor of claim 9 wherein said controller comprises a Schmitt hysteresis device coupled to said capacitor for determining when said capacitor has been charged to the predetermined threshold.

14. The temperature sensor of claim 9 wherein said controller is implemented in an ASIC.

15. A method for sensing temperature using a capacitor, a circuit element having a resistance that varies with temperature, and a plurality of calibration resistors having different resistance values, the method comprising:

sequentially charging the capacitor through the circuit element and each of the calibration resistors;

measuring a respective charging time required to charge the capacitor to a predetermined threshold through the circuit element and each of the calibration resistors;

determining a capacitance variation of the capacitor using the plurality of calibration resistors; and determining the temperature based upon the charging times and the capacitance variation.

16. The method of claim 15 wherein the circuit element comprises a thermistor.

17. The method of claim 15 wherein measuring the charging time comprises measuring the charging time using a counter.

18. The method of claim 15 wherein charging the capacitor comprises coupling a driver to the circuit element and charging the capacitor using the driver.

* * * * *